(12) United States Patent
Jeon et al.

(10) Patent No.: US 8,566,448 B2
(45) Date of Patent: Oct. 22, 2013

(54) SYSTEM AND METHOD FOR PROVIDING DEVICE FILE USING DEVICE IDENTIFIER

(75) Inventors: Jong Hong Jeon, Daejeon (KR); Seung Yun Lee, Daejeon (KR); Kang Chan Lee, Daejeon (KR); Won Suk Lee, Daejeon (KR); Min Kyo In, Daejeon (KR); Sung Han Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 985 days.

(21) Appl. No.: 12/634,904

(22) Filed: Dec. 10, 2009

(65) Prior Publication Data

US 2010/0161804 A1 Jun. 24, 2010

(30) Foreign Application Priority Data

Dec. 18, 2008 (KR) ........................ 10-2008-0129159

(51) Int. Cl.
*G06F 15/173* (2006.01)
(52) U.S. Cl.
USPC ........... 709/226; 709/203; 709/206; 709/243; 709/238; 709/224; 705/64
(58) Field of Classification Search
USPC ............. 709/226, 206, 243, 238, 224; 705/64
See application file for complete search history.

(56) References Cited

U.S. PATENT DOCUMENTS

| | | | | |
|---|---|---|---|---|
| 5,835,627 A | * | 11/1998 | Higgins et al. | 382/167 |
| 6,678,770 B1 | * | 1/2004 | Sutoh | 710/110 |
| 7,340,438 B2 | * | 3/2008 | Nordman et al. | 705/64 |
| 7,987,421 B1 | * | 7/2011 | Timothy et al. | 715/243 |
| 8,296,413 B2 | * | 10/2012 | Bornhoevd et al. | 709/224 |
| 2002/0147766 A1 | * | 10/2002 | Vanska et al. | 709/203 |
| 2002/0174073 A1 | * | 11/2002 | Nordman et al. | 705/64 |
| 2008/0208950 A1 | | 8/2008 | Kim et al. | |
| 2008/0220759 A1 | | 9/2008 | Norrman | |
| 2010/0179991 A1 | * | 7/2010 | Lorch et al. | 709/206 |
| 2010/0281258 A1 | * | 11/2010 | Andress et al. | 713/168 |
| 2011/0271007 A1 | * | 11/2011 | Wang et al. | 709/238 |

FOREIGN PATENT DOCUMENTS

| | | |
|---|---|---|
| KR | 1020040044657 A | 5/2004 |
| KR | 1020060021562 A | 3/2006 |
| KR | 1020070026979 A | 3/2007 |
| KR | 1020070027134 A | 3/2007 |
| KR | 1020080021562 A | 3/2008 |
| KR | 1020080031313 A | 4/2008 |

\* cited by examiner

*Primary Examiner* — Tammy Nguyen
(74) *Attorney, Agent, or Firm* — Ladas & Parry LLP

(57) ABSTRACT

A system and method for providing a device profile using a device identifier are disclosed. The system for providing a device profile using a device identifier includes: a mobile terminal that provides a device identifier having information regarding a hierarchical structure of a server and a model name; a plurality of servers that analyze the device identifier to recognize the lowermost server when the device identifier is queried, acquire a device profile corresponding to the device identifier through the lowermost server, and provide the acquired device profile; and an application server that connects to one of the plurality of servers, queries the device identifier, and is provided with a device profile corresponding to the device identifier. Device description of various mobile terminals can be more effectively managed and used in a mobile environment.

19 Claims, 9 Drawing Sheets

(a) - Nokia.Vodafone.N95

(b) - Samsung.Germany.T-Mobile.SPH-0011

(c) - Apple.Japan.Softbank.iPhone-3G-16

(d) - ETRI:Wibro:TT-SPX01

(e) - HTC;Google;T-Mobile;PD-0010

(f) - Samsung.SKT.SPH-0011

(a) – Nokia.Vodafone.N95
(b) – Samsung.Germany.T-Mobile.SPH-0011
(c) – Apple Japan.Softbank.iPhone-3G-16
(d) – ETRI:Wibro:TT-SPX01
(e) – HTC;Google;T-Mobile;PD-0010
(f) – Samsung.SKT.SPH-0011

FIG. 2a

Define according to augmented Backus-Naur Form (BNF) defined in IETF RFC2234.
    del = %x2E / %x3B / %x3A ; "." / ";" / ":"
    dash = %x2D ; "-"
    alpha = %x41-5A / %x61-7A ; A-Z / a-z
    digit = %x30-39 ; 0-9
    ldh = alpha / dight / dash
    id-prefix = alpha / digit
    label = id-prefix [*61ldh id-prefix]
    sldn = label del label
    device identifier = *(label del) sldn

FIG. 2b

SYSTEM AND METHOD FOR PROVIDING DEVICE FILE USING DEVICE IDENTIFIER

CROSS-REFERENCE TO RELATED APPLICATIONS

This application claims the priority of Korean Patent Application No. 10-2008-0129159 filed on Dec. 18, 2008, in the Korean Intellectual Property Office, the disclosure of which is incorporated herein by reference.

BACKGROUND OF THE INVENTION

1. Field of the Invention

The present invention relates to a device description system and, more particularly, to a system and method for providing a device profile using a device identifier capable of effectively managing and using a device description of various mobile terminals in a mobile environment.

2. Description of the Related Art

A mobile terminal has diverse hardware and software characteristics, and even after the mobile terminal is rolled out as an early product, its device description may be dynamically altered due to external factors such as variations (i.e., transformations) between mobile communications providers, variations between national communications networks, the downloading of an application program, an addition of a new input/output device, and the like.

In order to provide an optimized service suitable for various mobile terminals, a system for effectively searching for and utilizing a device description is required.

However, the current device description management method, with respect to mobile terminals, simply allows for the static management of profile information, making it difficult to effectively search and utilize dynamically varying device descriptions as mentioned above.

FIG. 1 is a flow chart illustrating the process of the related art method for providing a device profile in a mobile environment.

With reference to FIG. 1, a mobile terminal 11 transmits a Web address (URL) (e.g., 11.exam.com.1xml) for acquiring its terminal information and a standardized device profile information file known as a UA profile by using an HTTP header known as HTTP_X_WAP_PROFILE, while requesting the providing of a particular uniform resource identifier (URI) (S1).

Then, an application server 12 is connected to a UAP server (e.g., 11.exam.com) of a manufacturer having the Web address (URL) which has been provided by the mobile terminal 11, requests an XML file corresponding to the terminal information 1xml of the mobile terminal 11, and receives the same (S2 and S3).

The application server 12 parses the received XML file to extract a UA profile (S4), analyzes the HA profile to acquire device characteristics of the mobile terminal 11 (S5), adjusts contents or an application to be provided to the mobile terminal according to the acquired device characteristics, and provides the adjusted contents or application (S6 and S7).

In this manner, in the related art method for providing a device profile, the device description is statically stored in the particular server and accessed.

Namely, the mobile terminal device description is managed in a centralized manner, or is separately managed, according to device manufacturer, independently of other mobile terminal device descriptions.

Such a method only allows for the management of an initial mobile terminal device description, forbidding multiple variations or having difficulty in maintaining consistency between transformed information items.

In addition, the current method does not allow for providing of dynamic profile information altered after an initial product is rolled out.

SUMMARY OF THE INVENTION

An aspect of the present invention provides a system and method for providing a device profile using a device identifier capable of allowing various device description repository (DDR) servers to be distributed through a hierarchical system yet have connectivity with each other, thus enhancing efficiency in the management and utilization of a device description and enhancing consistency and expandability in the management of a device description.

According to an aspect of the present invention, there is provided a system for providing a device profile using a device identifier, including: a mobile terminal that provides a device identifier having information regarding a hierarchical structure of a server and a model name; a plurality of servers that analyze the device identifier to recognize the lowermost server when the device identifier is queried, acquire a device profile corresponding to the device identifier through the lowermost server, and provide the acquired device profile; and an application server that connects to one of the plurality of servers, queries the device identifier, and is provided with a device profile corresponding to the device identifier.

The device identifier may include: one or more classification names expressing the hierarchical structure of the plurality of servers; a model name added to the end of each of the classification name to express a mobile terminal model name; and one or more boundary symbols added between the classification names and between the classification name and the model name to discriminate the classification names, wherein the classification names are extendible from the left to the right according to the hierarchical structure of the plurality of servers.

The classification names and the model names may be expressed by a combination including one or more of an English upper case and lower case letter, characters of multiple languages, a hyphen, and numbers from 0 to 9, and the boundary symbols may be one of special symbols.

Among the plurality of servers, the uppermost server may provide an IP address of a server corresponding to the uppermost classification name of the device identifier, and an upper server may have a hierarchical structure providing an IP address of a lower server.

Each of the plurality of servers may include: a data storage unit that stores the device profile corresponding to the device identifier and an IP address of each of the servers having an upper and lower hierarchical relationship; a searching unit that searches a device profile corresponding to a device identifier queried by the application server and provides the same; an open API that searches a device profile corresponding to a device identifier queried by the external server and provides the same through communication with the external server; an information providing unit that searches the data storage unit to acquire the device profile queried by the application server or the external server, and provides the same to the searching unit or the open API; and a management unit that receives update information through the open API upon communication with the external server, and updates information stored in the data storage unit according to the received update information.

The searching unit may check whether or not the device profile corresponding to the device identifier queried by the application server has been stored, and if the device profile has been stored, the searching unit may provide the stored device profile to the application server, whereas if the device profile has not been stored, the searching unit may analyze the device identifier to recognize the lowermost server, receive the device profile from the lowermost server, and provide the received device profile to the application server.

The searching unit may extract the classification name of each stage from the device identifier and sequentially inquire of an upper server about an IP address of a server of a lower classification name until such time as there remains no more classification name of a lower stage, and when there is no more classification name of a lower stage, the searching unit may acquire an IP address of a finally queried server as an IP address of the lowermost server.

The open API may be implemented as one of an XML-RPC (eXtensible Markup Language-Remote Procedure) interface allowing for query searching based on an XML-RPC, a Web service interface based on a simple object access protocol (SOAP) and a Web services description language (WSDL), and a REST type interface based on an HTTP GET scheme.

The data storage unit may include: a device profile storage unit that stores the device profile corresponding to the device identifier; and a server information storage unit that stores the IP addresses of the servers corresponding to the device identifier.

Each of the plurality of servers may further include a shared caching unit that caches the device profile searched by the information providing unit and the IP addresses of the servers searched by the searching unit, wherein the searching unit and the open API preferentially use the information cached in the shared caching unit.

The mobile terminal may have the device identifier specified (described) in an operating system.

The mobile terminal may request the providing of contents or an application through the device identifier.

When the application server is requested to provide contents or an application through the device identifier, the application server may receive a device profile corresponding to the device identifier from one of the plurality of servers, adjust the contents according to the device characteristics of the mobile terminal according to the received device profile, and provide the adjusted contents to the mobile terminal.

According to another aspect of the present invention, there is provided a server connected with at least one application server and at least one external server, including: a data storage unit that stores a device profile corresponding to a device identifier having information regarding a hierarchical structure of the server and a model name of a mobile terminal and an IP address of each of the servers having an upper and lower hierarchical relationship; a searching unit that searches a device profile corresponding to a device identifier queried by the application server and provides the same; an open API that searches a device profile corresponding to a device identifier queried by the external server and provides the same through communication with the external server; an information providing unit that searches the data storage unit to acquire the device profile queried by the application server or the external server, and provides the same to the searching unit or the open API; and a management unit that receives update information through the open API upon communication with the external server, and updates information stored in the data storage unit according to the received update information.

The searching unit may check whether or not the device profile corresponding to the device identifier queried by the application server has been stored, and if the device profile has been stored, the searching unit may provide the stored device profile to the application server, whereas if the device profile has not been stored, the searching unit may analyze the device identifier to recognize the lowermost server, receive the device profile from the lowermost server, and provide the received device profile to the application server.

The searching unit may extract the classification name of each stage from the device identifier and sequentially inquire of an upper server about an IP address of a server of a lower classification name until such time as there are no remaining lower stage classification names, and when there are no remaining lower stage classification names, the searching unit may acquire an IP address of a finally queried server as an IP address of the lowermost server.

The server may further include: a shared caching unit that caches the device profile searched by the information providing unit and the IP addresses of the servers searched by the searching unit, wherein the searching unit and the open API may preferentially use the information cached in the shared caching unit.

According to another aspect of the present invention, there is provided a method for providing contents using a device identifier of an application server connected with a mobile terminal and a plurality of servers having a hierarchical structure, including: receiving a device identifier having information regarding a hierarchical structure of a server and a model name from the mobile terminal; querying one of the plurality of servers about the device identifier; and processing contents according to a device profile provided from one of the plurality of servers and providing the processed contents to the mobile terminal.

According to another aspect of the present invention, there is provided a method for providing a device profile using a device identifier of a server connected with at least one application server and at least one external server, the method comprising: when a device identifier having information regarding a hierarchical structure of a server and a model name is queried by the application server, acquiring a device profile corresponding to the device identifier and providing the acquired device profile to the application server; and when the device identifier is queried by one of the plurality of external servers, checking whether or not the device profile corresponding to the device identifier has been stored, and if the device profile has been stored, providing the device profile corresponding to the device identifier to the corresponding external server, or otherwise, providing an IP address of a lower server to the corresponding external server.

BRIEF DESCRIPTION OF THE DRAWINGS

The above and other aspects, features and other advantages of the present invention will be more clearly understood from the following detailed description taken in conjunction with the accompanying drawings, in which:

FIGS. 2a and 2b are views for explaining a method for defining a device identifier according to an exemplary embodiment of the present invention;

DETAILED DESCRIPTION OF THE PREFERRED EMBODIMENT

Figure 1:
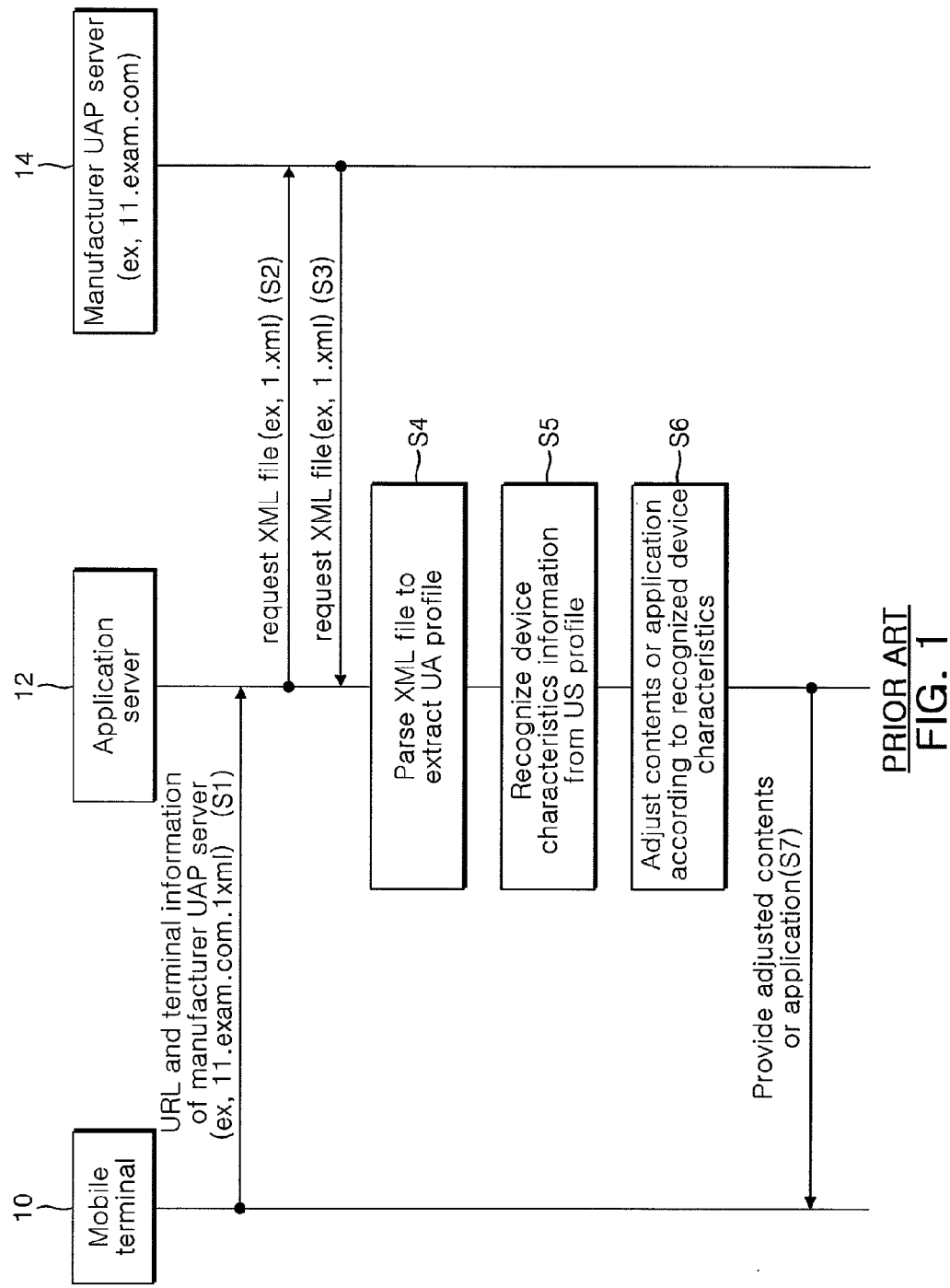
FIG. 1 is a flow chart illustrating the process of a method for providing a device profile in a mobile environment according to the related art.

Exemplary embodiments of the present invention will now be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art. In describing the present invention, if a detailed explanation for a related known function or construction is considered to unnecessarily divert the gist of the present invention, such explanation will be omitted but would be understood by those skilled in the art.

In order to clarify the present invention, parts irrelevant to the description of the present invention are omitted, and the same reference numerals will be used throughout to designate the same or like components.

Unless explicitly described to the contrary, the word "comprise" and variations such as "comprises" or "comprising," will be understood to imply the inclusion of stated elements but not the exclusion of any other elements.

Before explaining a system for providing a device profile, a device identifier to be used in the present invention will be explained to help understand the present invention.

FIGS. 2a and 2b are views for explaining a method for defining a device identifier according to an exemplary embodiment of the present invention.

With reference to FIG. 2a, a device identifier according to an exemplary embodiment of the present invention includes one or more classification names expressing a hierarchical structure of device description repository (DDR) servers, a model name added to a final stage of the classification names to express a model name; and one or more boundary symbols added between the classification names and between a classification name and a model name to discriminate the classification name. In this case, the classifications may extend from the left to the right according to the hierarchical structure of the DDRR servers.

In more detail, the classification name is expressed by a combination including one or more of an English upper case and lower case letter, characters of multiple languages, a hyphen, and numbers from 0 to 9, and includes information about a device manufacturer, a service provider, a service providing method, and a service providing area. As the boundary symbol, a special character such as ".", ";", or ":" may be applied.

The model name is expressed by a combination of one or more of an English upper case and lower case letter, characters of multiple languages, a hyphen, and numbers from 0 to 9, and indicates a mobile terminal model name.

Preferably, the terms used for the classification name, the boundary symbol, and the model name follow an augmented Bakus Naur Form (ABNF) method defined in IETF RFC2234 as shown in FIG. 2b.

With reference to FIG. 2, the device identifier according to an exemplary embodiment of the present invention includes classification names and model names of several stages (i.e., Nokia.Vodafone.N95, Samsung.Germany.T-Moboile.SPH-0011, Apple.Japan.Softbank.Iphone-3G-16, ETRI:Wibro: TT-SPX01, HTC;Google;T-Mobile;PD-0010) as indicated by (a) to (e) in order to express a hierarchical structure of the DDR servers and variably and clearly express information regarding a mobile service providing environment which is dynamically varied.

Also, it is noted that the boundary symbols may be varied as necessary.

As indicated by (f) of FIG. 2(a), the classification name of the device identifier may be expressed by a multi-language (i.e., Samsung.SKT.SPH-0011) according to an international domain name system, to localize it according to each country.

Figure 3:
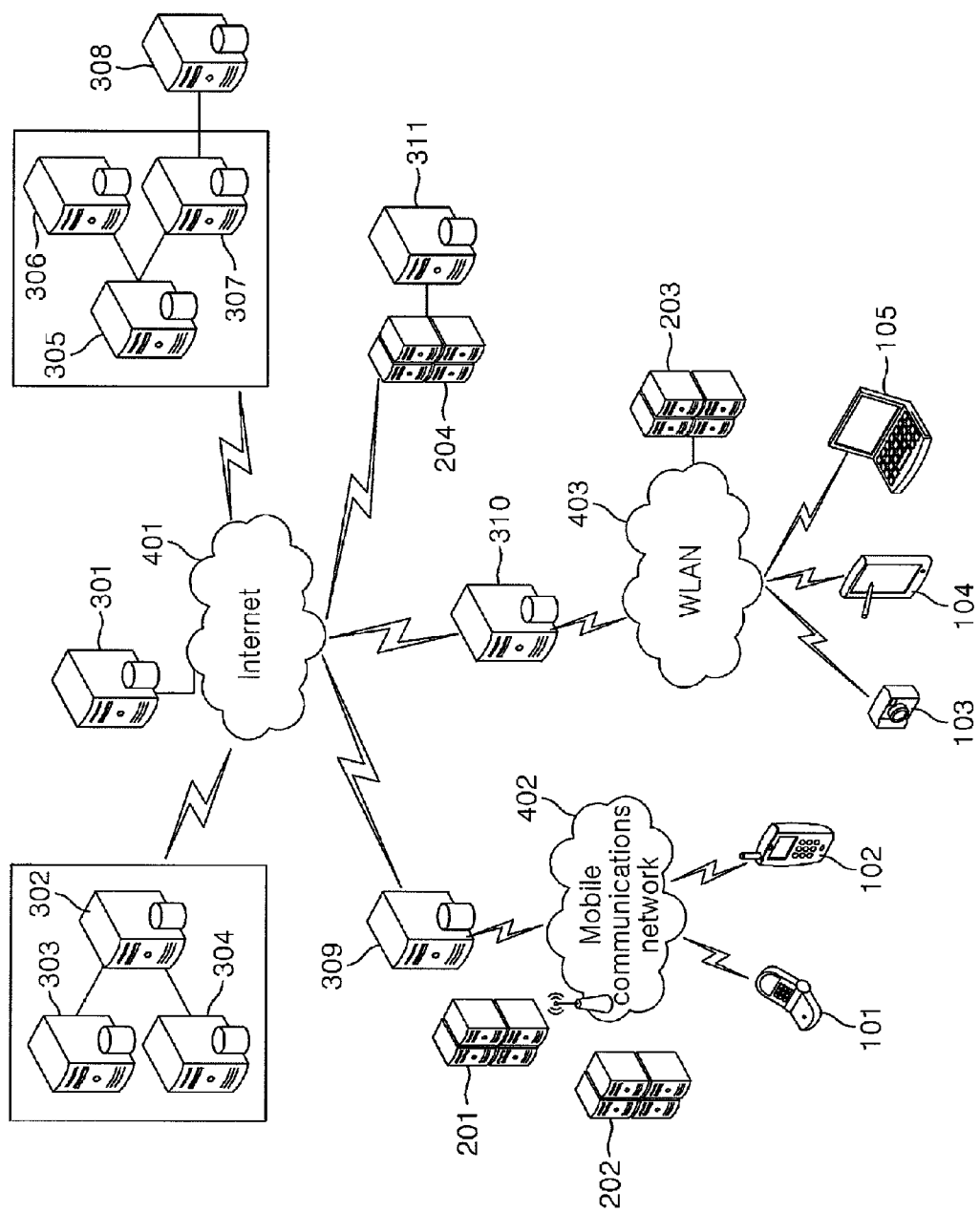
FIG. 3 illustrates the configuration of a system for providing a device profile using a device identifier according to an exemplary embodiment of the present invention.

FIG. 3 illustrates the configuration of a system for providing a device profile using a device identifier according to an exemplary embodiment of the present invention.

With reference to FIG. 3, the device profile providing system includes a plurality of mobile terminals 101 to 105, a plurality of application servers 201 to 204, a plurality of DDR servers 301 to 311, and a plurality of communications networks 401 to 403.

Each element functions as follows.

Each of the plurality of mobile terminals 101 to 105 is implemented as an electronic device that performs wireless communications such as a mobile phone, a digital camera, a personal digital assistant (PDA), a notebook computer, or the like, and has specifications of the device identifier defined as shown in FIG. 2a in an operating system thereof. One of the mobile terminals may request the providing of particular contents or an application from the application server 201 through the device identifier, and is provided with contents or an application which has been adjusted suitably according to the device characteristics of the mobile terminal from the application server 201.

When each of the plurality of application servers 201 to 204 is requested to provide contents or an application through the device identifier by a particular mobile terminal (e.g., 101), it queries a local DDR server 309 connected thereto about the device identifier and receives a device profile corresponding to the device identifier. Each of the plurality of application servers 201 to 204 adjusts the contents or application such that the contents or application fits the device characteristics (e.g., screen size, resolution, etc.) of the corresponding mobile terminal 101 according to the received device profile, and then provides the adjusted contents or application to the corresponding mobile terminal 101.

For reference, each of the mobile terminals 101 to 104 inserts the device identifier to a UserAgent field of an HTTP header and provides the same to the application server 201, and the application server 201 analyzes the UserAgent field of the HTTP header to extract the device identifier.

Figure 4:
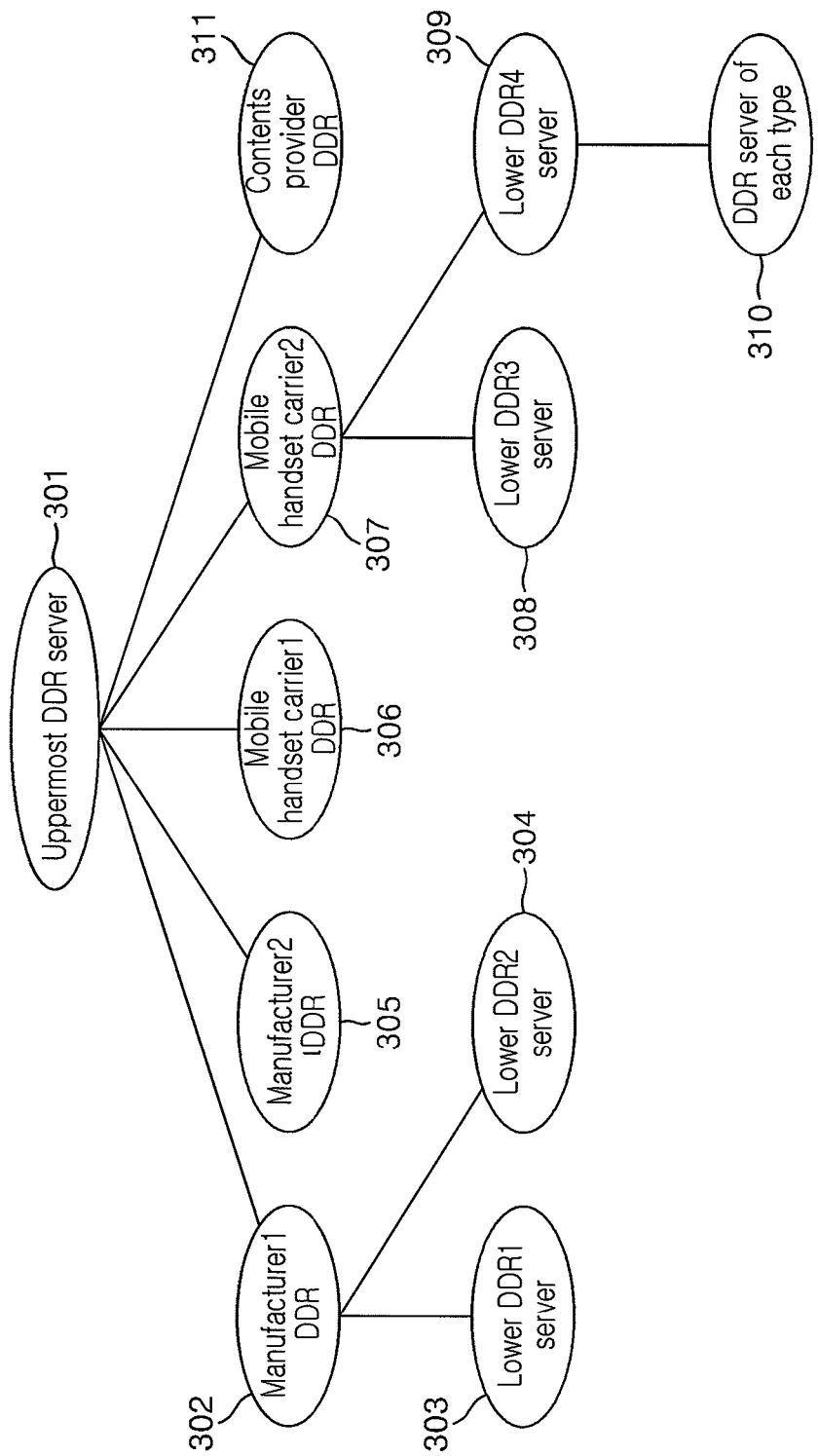
FIG. 4 illustrates a schematized hierarchical structure of a plurality of DDR servers.

The plurality of DDR servers 301 to 311 have a hierarchical structure as shown in FIG. 4, and store the device profile corresponding to the device identifier. When a device identifier is queried by a particular application server (e.g., 201), the device identifier is analyzed to recognize the lowermost DDR server, a device profile corresponding to the queried device identifier is acquired through the lowermost DDR server, and is then provided to the application server 201.

With reference to FIG. 4, the plurality of DDR servers 301 to 311 include the uppermost DDR server 301, the intermediate DDR servers 302, 307, and 309 having an upper and lower hierarchical relationship, and the lowermost DDR servers 303, 304, 305, 306, 308, 310, and 311 having only an upper hierarchical relationship.

The uppermost DDR server 301 includes an IP address of each of the DDR servers 302, 305, 306, 307, and 311 positioned at the uppermost layer in each classification, and an upper DDR server (e.g., 309) in each application has an IP address of a DDR server (e.g., 310) which is placed at a lower position with relation to the upper DDR server 309. The lowermost DDR servers 303, 304, 305, 306, 308, 310, and 311 have a device profile corresponding to a device identifier or a model name of the device identifier.

The lowermost DDR servers 303, 304, 305, 306, 308, 310, and 311 may have a device profile corresponding to a device identifier or a model name of the device identifier, if necessary.

The detailed configuration of the DDR servers will now be described with reference to FIG. 5.

Figure 5:
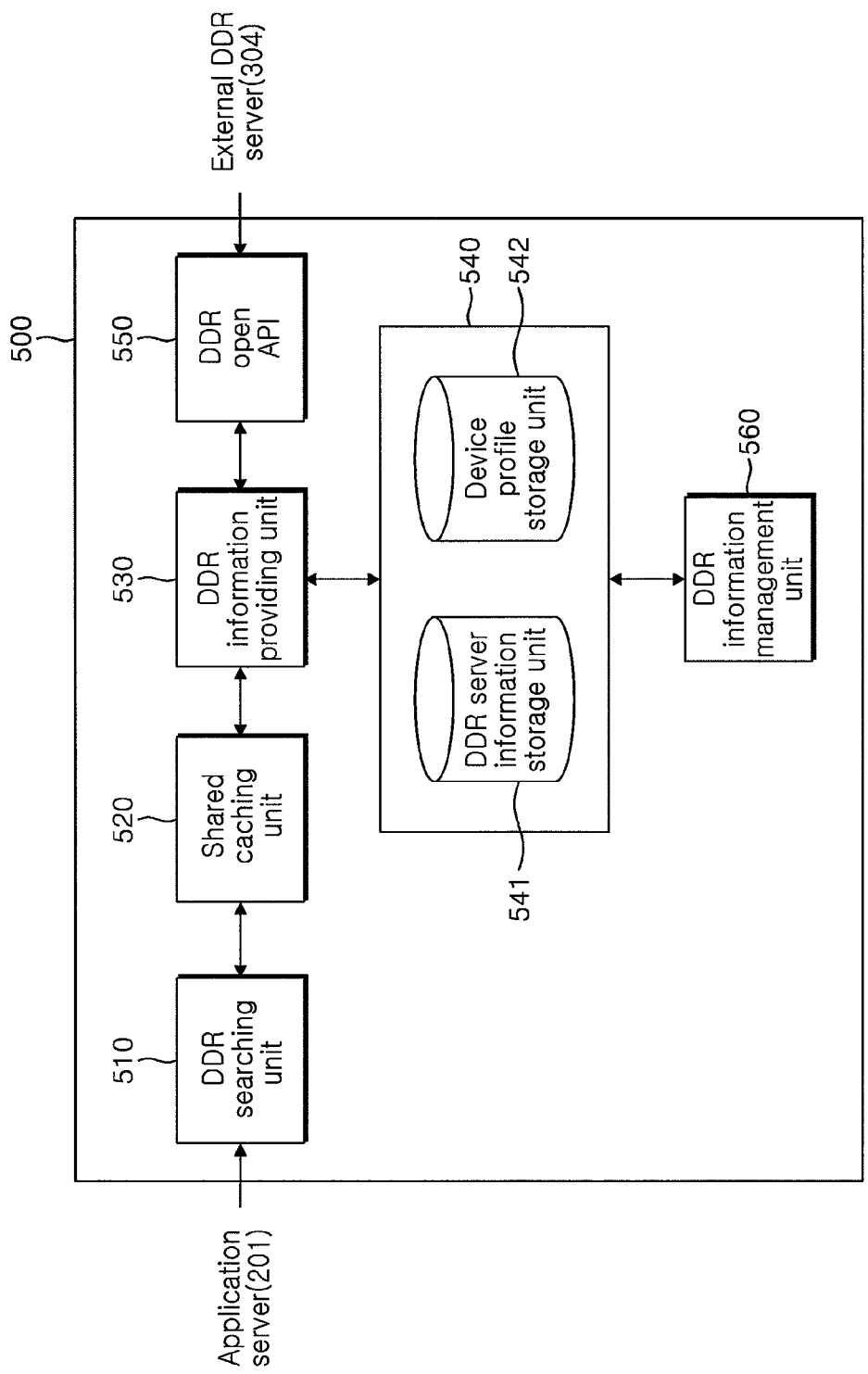
FIG. 5 is a detailed block diagram of a DDR server according to an exemplary embodiment of the present invention.

FIG. 5 is a detailed block diagram of a DDR server according to an exemplary embodiment of the present invention.

With reference to FIG. 5, a DDR server 500 includes a DDR searching unit 510, a shared caching unit 520, a DDR information providing unit 530, a data storage unit 540, a DDR open application programming interface (API) 550, and a DDR information management unit 560.

Each element functions as follows.

When a device identifier is queried by an application server (e.g., 201), the DDR searching unit 510 provides a corresponding device profile cached in the shared caching unit 520 in response.

If, however, there is no corresponding device profile in the share caching unit 520, the DDR searching unit 510 analyzes a hierarchical structure of the device identifier to recognize the lowermost DDR server (e.g., 304), receives the corresponding device profile from the lowermost DDR server 304, and provides the received device profile to the corresponding application server 201.

To this end, the DDR searching unit 510 extracts the classification name of each stage from the device identifier, and sequentially inquires of an upper DDR server about an IP address of a DDR server of a lower classification name until when there is no remaining lower stage classification name. When there is no remaining lower stage classification name, the DDR searching unit 510 acquires an IP address of a finally queried DDR server as an IP address of the lowermost DDR server.

The shared caching unit 520 is commonly managed by the DDR searching unit 510 and the DDR information providing unit 530, and caches IP address of the DDR servers searched by the DDR searching unit 510 and device profiles searched by the DDR information providing unit 530. Thus, because the DDR searching unit 510 preferentially uses the information cached in the shared caching unit 520, it can have a faster response speed.

When a device identifier is queried by the DDR searching unit 510, the DDR information providing unit 530 searches the data storage unit 540 to acquire a device profile corresponding to the device identifier, and caches the acquired device profile to the share caching unit 520.

When a device identifier is queried through the DDR open API 550, the DDR information searches the data storage unit 540 and checks whether or not there is a device profile corresponding to the device identifier. Upon checking if the corresponding device profile has been stored in the data storage unit 540, the DDR information providing unit 530 provides the device profile to the DDR open API 550, or otherwise, the DDR information providing unit 530 acquires an IP address of a DDR server (namely, a lower DDR server) placed at a lower position and provides the acquired IP address to the DDR open API 550.

The data storage unit 540 includes a DDR server information storage unit 542 that stores information (in particular, an IP address) related to the DDR servers having a hierarchical relationship with the DDR server 500 and a device profile storage unit 542 that stores a device profile corresponding to a device identifier or a model name of the device identifier.

The DDR open API 550 communicates with an external DDR server 304 (or external DDR servers) through an open API to share a device profile stored in the DDR open API 550 itself or stored in the external DDR server 304. In particular, when a device identifier is queried by the external DDR server 304, the DDR open API 550 provides a device profile corresponding to the queried device identifier or an IP address in response.

The open API is implemented as one of an XML-RPC (eXtensible Markup Language-Remote Procedure) interface allowing for query searching based on an XML-RPC, a Web service interface based on a simple object access protocol (SOAP) and a Web services description language (WSDL), and a REST type interface based on an HTTP GET scheme.

The DDR information management unit 560 periodically communicates with the external DDR server 304 through the DDR open API 550 to receive update information, and updates the information stored in the data storage unit 540 according to the update information. Namely, the DDR information management unit 560 periodically updates the device profile stored in the data storage unit 540, the IP address and relevant information of the DDR servers.

Figure 6:
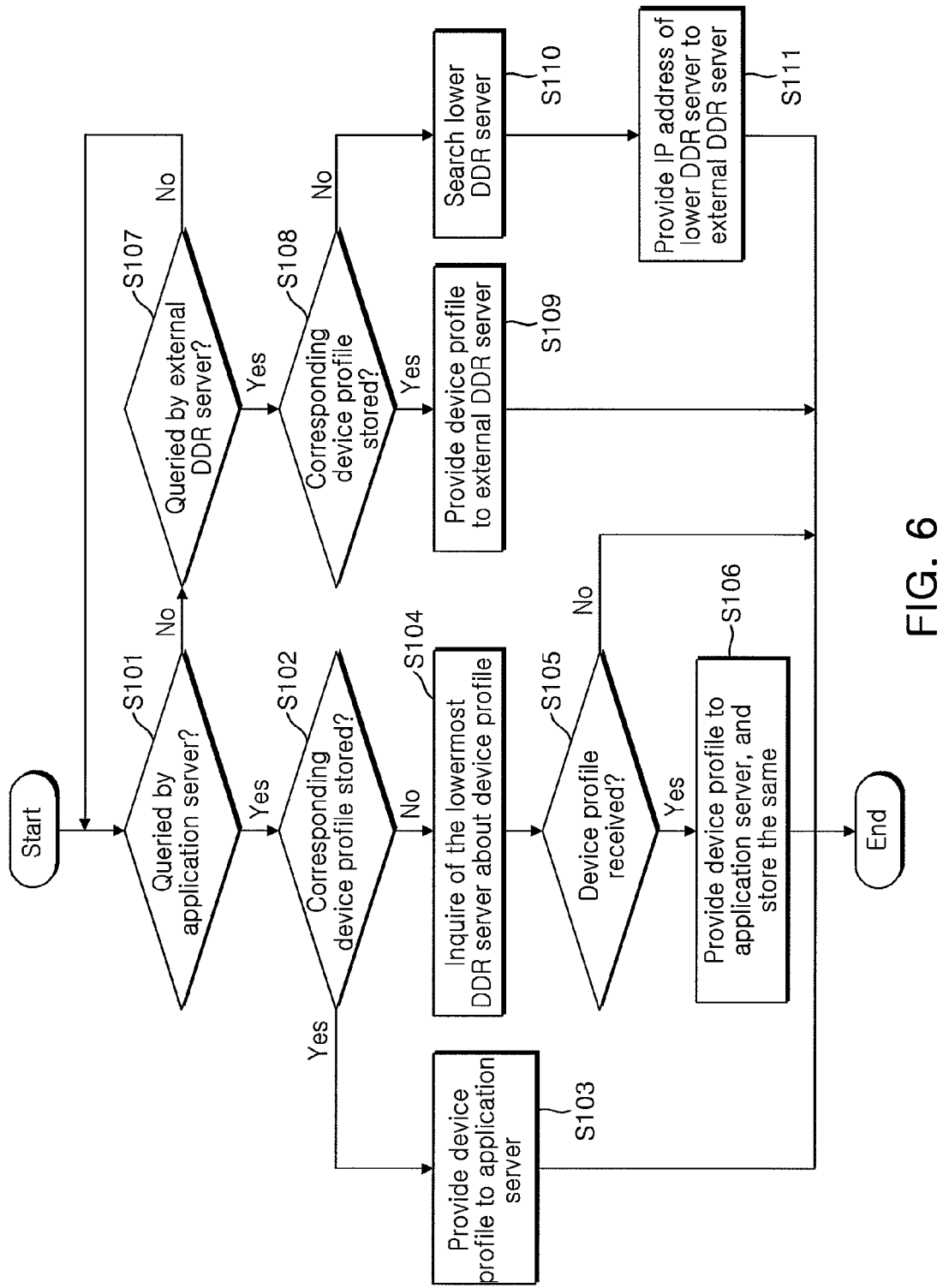
FIG. 6 is a flow chart illustrating the process of a method for providing a device profile using a device identifier of the DDR server according to an exemplary embodiment of the present invention.

FIG. 6 is a flow chart illustrating the process of a method for providing a device profile using a device identifier of the DDR server according to an exemplary embodiment of the present invention.

First, when the application server inquires about a device identifier (S101), the DDR server checks whether or not a device profile corresponding to the queried device identifier has been stored (S102).

If the corresponding device profile has been stored, the DDR server provides the device profile to the corresponding application server (S103), or otherwise, the DDR server analyzes a hierarchical relationship of the device identifier to recognize the lowermost DDR server, and queries the lowermost DDR server about the device identifier (S104).

When the device profile corresponding to the device identifier is provided from the lowermost DDR server (S105), the DDR server provides the received device profile to the corresponding application server, stores it, and terminates the operation (S106).

Meanwhile, if an external DDR server inquires about a device identifier (S107), the DDR server checks whether or not a device profile corresponding to the queried device identifier has been stored therein (S108).

If the corresponding device profile has been stored, the DDR server provides the stored device profile to the corresponding external DDR server (S109), or otherwise, the DDR server searches an IP address of a DDR server (namely, a lower DDR server) placed at a lower level of the DDR server (S110), and provides the IP address of the lower DDR server, so that the external DDR server can be provided with the device profile through the lower DDR server (S111).

Figure 7:
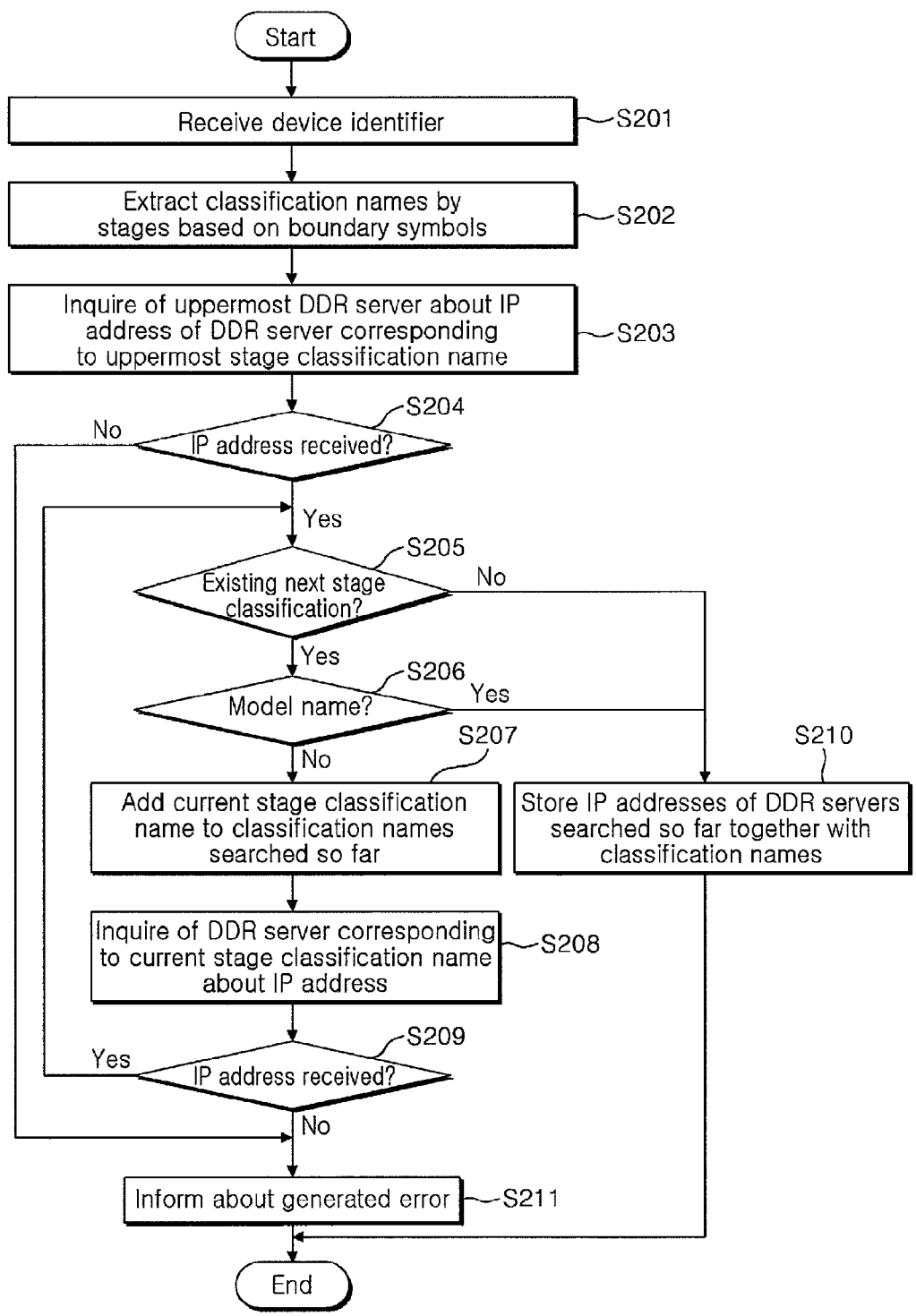
FIG. 7 is a flow chart illustrating the process of a method for searching the lowermost DDR server in FIG. 6.

FIG. 7 is a flow chart illustrating the process of a method for searching the lowermost DDR server in FIG. 6.

When the DDR server receives a device identifier as defined in FIG. 2 (S201), the DDR server classifies the device identifier into classification names and model names by stages by discriminating between boundary symbols. Namely, the DDR server extracts the classification names and model names from the device identifier (S202).

The DDR server queries the upper most DDR server about an IP address of a DDR server corresponding to the uppermost stage classification name of the device identifier (s203) to acquire an IP address of the DDR server corresponding to the uppermost stage classification name (S204).

The DDR server checks whether there is a remaining lower stage classification name (S205). If there is a remaining lower stage classification name, the DDR server checks whether the corresponding classification name is a model name (S206).

If the lower stage classification name is not a model name, the DDR server adds the classification name acquired in step S204 to the classification names searched to this point to create a classification name to be searched next time (S207). And then, the DDR server queries the DDR server corresponding to the classification name acquired in step S204 about an IP address (S208) and receives the IP address of the corresponding DDR server (S209).

The DDR server repeatedly performs steps S205 to S210 until such time as there are no remaining lower stage classification names, and when there is no more lower stage classification name, the DDR server acquires a DDR server corresponding to a finally searched classification name as the lowermost DDR server. The DDR server then stores the IP addresses of the DDR servers searched so far together with the classification names (S210).

If an error occurs during the searching process of the DDR server, whereby an IP address is not normally received, the DDR server informs of the generated error and terminates the operation (S211).

In this manner, the DDR server performs searching by hierarchically analyzing the classification names of the device identifier, thereby easily acquiring the IP address of all the DDR servers related to the corresponding device identifier, in particular, the IP address of the lowermost DDR server.

Figure 8:
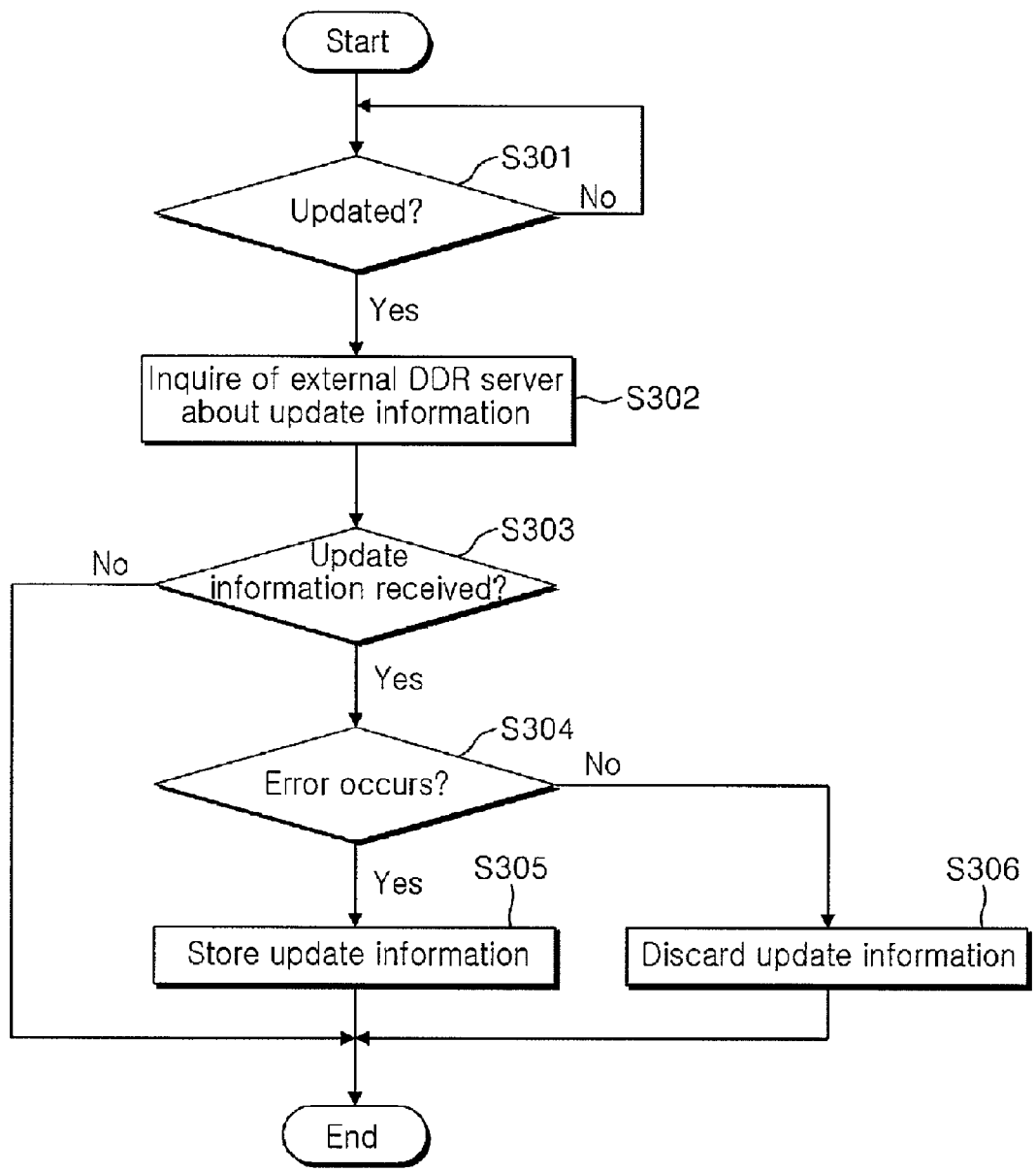
FIG. 8 is a flow chart illustrating the process of a method for updating a device profile of the DDR server according to an exemplary embodiment of the present invention.

FIG. 8 is a flow chart illustrating the process of a method for updating a device profile of the DDR server according to an exemplary embodiment of the present invention.

First, when the DDR server needs updating (S301), it queries an external DDR server about update information (S302).

When the external DDR server provides update information in response (S303), the DDR server analyzes the update information to check whether or not there is an error (S304).

If there is no error in the update information, the DDR server extracts a device profile, an IP address of a DDR server, or the like, from the update information, and updates the device profile and the IP address of the DDR server stored in the data storage unit by using the same (S305).

If, however, there is an error in the update information, the DDR server confirms the reception of the erroneous information and discards the update information (S306).

Figure 9:
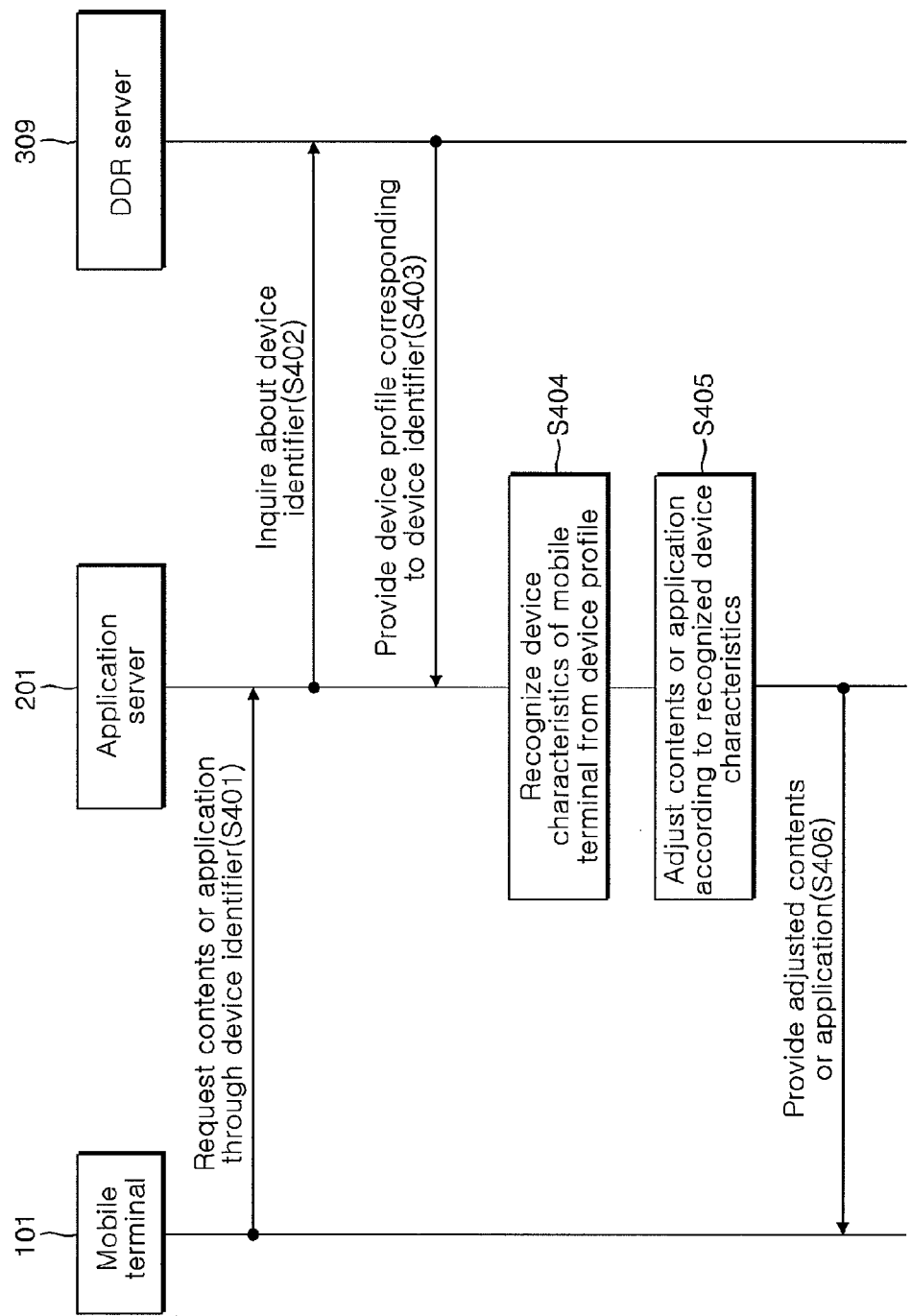
FIG. 9 is a flow chart illustrating the process of a method for providing contents using an application server device identifier according to an exemplary embodiment of the present invention.

FIG. 9 is a flow chart illustrating the process of a method for providing contents using an application server device identifier according to an exemplary embodiment of the present invention.

When the mobile terminal 101 connects to the application server 201 and requests the providing of particular contents or an application through a device identifier (S401), the application server 201 inquires of a local DDR server 309 connected to the application server 201 about the device identifier in response (S402).

The local DDR server 309 operates according to the device profile providing method illustrated in FIG. 6 to acquire a device profile corresponding to the device identifier, and provides the acquired device profile to the corresponding application server 201 (S403).

The application server 201 recognizes the device characteristics of the mobile terminal 101 from the device profile provided in step S403 (S404), adjusts the operational characteristics of the contents or application to be provided by the application server 201 such that the operational characteristics fit the device characteristics of the mobile terminal 101 (S405), and provides the same to the mobile terminal 101 (S406).

As set forth above, the system and method for providing a device profile using a device identifier according to exemplary embodiments of the invention proposes a device identifier that can express a hierarchical structure of a DDR server for providing device description of a mobile terminal. A device description can be searched by using the device identifier, whereby DDR servers can have connectivity in a state that they are distributedly positioned.

Thus, the efficiency in management and utilization of device description can be enhanced, and also consistency and expandability in managing the device description can be increased.

In addition, because the device description of a mobile terminal can be acquired quickly and accurately, an optimized service fitting the mobile terminal can be provided.

While the present invention has been shown and described in connection with the exemplary embodiments, it will be apparent to those skilled in the art that modifications and variations can be made without departing from the spirit and scope of the invention as defined by the appended claims.

What is claimed is:

1. A system for providing a device profile using a device identifier, the system comprising:
    a mobile terminal that provides a device identifier having information regarding a hierarchical structure of a server and a model name,
    wherein the hierarchical structure of the server comprises at least an uppermost server and a plurality of lowermost servers, and
    wherein the uppermost server comprises an IP address of each of the plurality of lowermost servers;
    a plurality of servers that analyze the device identifier to recognize the lowermost server when the device identifier is queried, acquire a device profile corresponding to the device identifier through the uppermost server to the lowermost server, and provide the acquired device profile; and
    an application server that connects to one of the plurality of servers, queries the device identifier, and is provided with a device profile corresponding to the device identifier.

2. The system of claim 1, wherein the device identifier comprises:
    one or more classification names expressing the hierarchical structure of the plurality of servers;
    a model name added to the end of each of the classification name to express a mobile terminal model name; and
    one or more boundary symbols added between the classification names and between the classification name and the model name to discriminate the classification names,
    wherein the classification names are extendible from the left to the right according to the hierarchical structure of the plurality of servers.

3. The system of claim 2, wherein the classification names and the model names are expressed by a combination including one or more of an English upper case and lower case letter, characters of multiple languages, a hyphen, and numbers from 0 to 9, and the boundary symbols are one of special symbols.

4. The system of claim 1, wherein, among the plurality of servers, the uppermost server provides an IP address of a server corresponding to the uppermost classification name of the device identifier, and an upper server has a hierarchical structure providing an IP address of a lower server.

5. The system of claim 1, wherein each of the plurality of servers comprises:
a data storage unit that stores the device profile corresponding to the device identifier and an IP address of each of the servers having an upper and lower hierarchical relationship;
a searching unit that searches a device profile corresponding to a device identifier queried by the application server and provides the same;
an open API that searches a device profile corresponding to a device identifier queried by the external server and provides the same through communication with the external server;
an information providing unit that searches the data storage unit to acquire the device profile queried by the application server or the external server, and provides the same to the searching unit or the open API; and
a management unit that receives update information through the open API upon communication with the external server, and updates information stored in the data storage unit according to the received update information.

6. The system of claim 5, wherein the searching unit checks whether or not the device profile corresponding to the device identifier queried by the application server has been stored, and if the device profile has been stored, the searching unit provides the stored device profile to the application server, whereas if the device profile has not been stored, the searching unit analyzes the device identifier to recognize the lowermost server, receives the device profile from the lowermost server, and provides the received device profile to the application server.

7. The system of claim 5, wherein the searching unit extracts the classification name of each stage from the device identifier and sequentially inquire of an upper server about an IP address of a server of a lower classification name until such time as there remains no more classification name of a lower stage, and when there is no more classification name of a lower stage, the searching unit acquires an IP address of a finally queried server as an IP address of the lowermost server.

8. The system of claim 5, wherein the open API is implemented as one of an XML-RPC (eXtensible Markup Language-Remote Procedure) interface allowing for query searching based on an XML-RPC, a Web service interface based on a simple object access protocol (SOAP) and a Web services description language (WSDL), and a REST type interface based on an HTTP GET scheme.

9. The system of claim 5, wherein the data storage unit comprises:
a device profile storage unit that stores the device profile corresponding to the device identifier; and
a server information storage unit that stores the IP addresses of the servers corresponding to the device identifier.

10. The system of claim 5, wherein each of the plurality of servers further comprises:
a shared caching unit that caches the device profile searched by the information providing unit and the IP addresses of the servers searched by the searching unit, wherein the searching unit and the open API preferentially use the information cached in the shared caching unit.

11. The system of claim 1, wherein the mobile terminal has the device identifier specified in an operating system.

12. The system of claim 1, wherein the mobile terminal requests the providing of contents or an application through the device identifier.

13. The system of claim 12, wherein when the application server is requested to provide contents or an application through the device identifier, the application server receives a device profile corresponding to the device identifier from one of the plurality of servers, adjusts the contents according to the device characteristics of the mobile terminal according to the received device profile, and provides the adjusted contents to the mobile terminal.

14. A server connected with at least one application server and at least one external server, the server comprising:
a data storage unit that stores a device profile corresponding to a device identifier having information regarding a hierarchical structure of the server and a model name of a mobile terminal,
wherein the hierarchical structure of the server comprises at least an uppermost server and a plurality of lowermost servers, and
wherein the uppermost server comprises an IP address of each of the plurality of lowermost servers, and
wherein the lowermost servers are connected at least one of directly or indirectly to the uppermost server;
a searching unit that searches a device profile corresponding to a device identifier queried by the application server and provides the same;
an open API that searches a device profile corresponding to a device identifier queried by the external server and provides the same through communication with the external server;
an information providing unit that searches the data storage unit to acquire the device profile queried by the application server or the external server, and provides the same to the searching unit or the open API;
and a management unit that receives update information through the open API upon communication with the external server, and updates information stored in the data storage unit according to the received update information.

15. The server of claim 14, wherein the searching unit checks whether or not the device profile corresponding to the device identifier queried by the application server has been stored, and if the device profile has been stored, the searching unit provides the stored device profile to the application server, whereas if the device profile has not been stored, the searching unit analyzes the device identifier to recognize the lowermost server, receives the device profile from the lowermost server, and provides the received device profile to the application server.

16. The server of claim 15, wherein the searching unit extracts the classification name of each stage from the device identifier and sequentially inquires of an upper server about an IP address of a server of a lower classification name until such time as there are no remaining lower stage classification names, and when there are no remaining lower stage classification names, the searching unit acquires an IP address of a finally queried server as an IP address of the lowermost server.

17. The server of claim 14, wherein the server further comprises:
- a shared caching unit that caches the device profile searched by the information providing unit and the IP addresses of the servers searched by the searching unit, wherein the searching unit and the open API preferentially use the information cached in the shared caching unit.

18. A method for providing contents using a device identifier of an application server connected with a mobile terminal and a plurality of servers having a hierarchical structure, the method comprising:
- receiving a device identifier having information regarding a hierarchical structure of a server and a model name from the mobile terminal;
- querying one of the plurality of servers about the device identifier,
- wherein the hierarchical structure of the plurality of servers comprises have at least two or more servers which are associated with each other according to their unique IP address; and
- processing contents according to a device profile provided from one of the plurality of servers and providing the processed contents to the mobile terminal.

19. A method for providing a device profile using a device identifier of a server connected with at least one application server and at least one external server, the method comprising:
- when a device identifier having information regarding a hierarchical structure of a server and a model name is queried by the application server, acquiring a device profile corresponding to the device identifier and providing the acquired device profile to the application server, and
- wherein the hierarchical structure of the server comprises at least two servers, and
- wherein each of the at least two servers have a unique IP address;
- and when the device identifier is queried by one of the plurality of external servers, checking whether or not the device profile corresponding to the device identifier has been stored, and if the device profile has been stored, providing the device profile corresponding to the device identifier to the corresponding external server, or otherwise, providing an IP address of a lower server to the corresponding external server.

* * * * *